United States Patent
Ishibashi

(10) Patent No.: US 7,020,385 B2
(45) Date of Patent: Mar. 28, 2006

(54) METHOD FOR INFORMATION RECORDING AND APPARATUS THEREFOR

(75) Inventor: Hiromichi Ishibashi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1121 days.

(21) Appl. No.: 09/802,652

(22) Filed: Mar. 9, 2001

(65) Prior Publication Data

US 2001/0022763 A1 Sep. 20, 2001

(30) Foreign Application Priority Data

Mar. 13, 2000 (JP) ........................................ 2000-068307

(51) Int. Cl.
*H04N 5/85* (2006.01)
*H04N 7/64* (2006.01)

(52) U.S. Cl. ........................................ 386/126; 386/113

(58) Field of Classification Search ................. 386/126, 386/125, 124, 113, 114, 46, 45, 40, 47, 76, 386/1, 21

See application file for complete search history.

(56) References Cited

U.S. PATENT DOCUMENTS

| | | | | |
|---|---|---|---|---|
| 4,688,202 A | * | 8/1987 | Mukai et al. | 369/44.32 |
| 5,165,089 A | * | 11/1992 | Jaquette et al. | 369/59.2 |
| 5,303,219 A | * | 4/1994 | Kulakowski et al. | 369/53.17 |

FOREIGN PATENT DOCUMENTS

| | | |
|---|---|---|
| JP | 63-7566 | 1/1988 |
| JP | 63-58670 | 3/1988 |
| JP | 5-210845 | 8/1993 |
| JP | 6-111479 | 4/1994 |
| JP | 9-284715 | 10/1997 |

* cited by examiner

*Primary Examiner*—Robert Chevalier
(74) *Attorney, Agent, or Firm*—Pearne & Gordon LLP

(57) ABSTRACT

In areas on an optical disk wherein defects are detected frequently, recording is carried out while the recording density of information blocks is lowered and the amount of picture information is reduced at the same time so that digital video signals can be recorded even when defects owing to dust and flaws are present on the optical disk and so that picture losses can be prevented from occurring during reproduction.

18 Claims, 8 Drawing Sheets

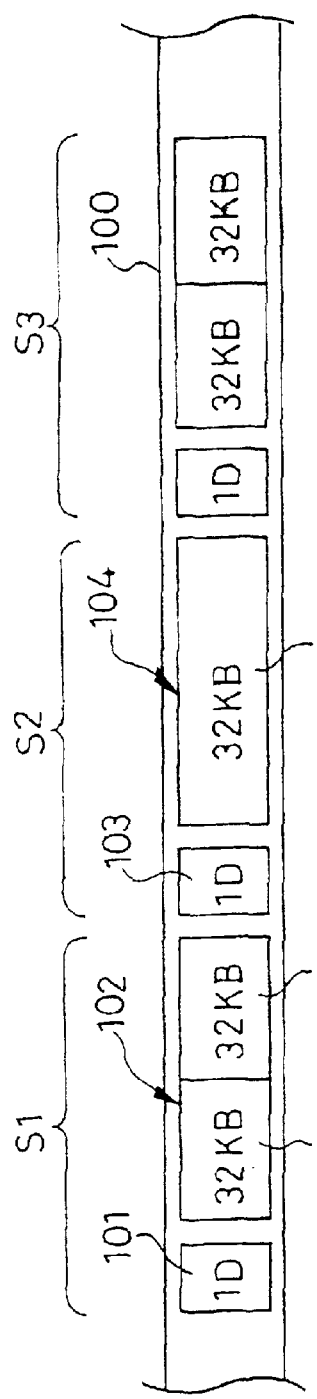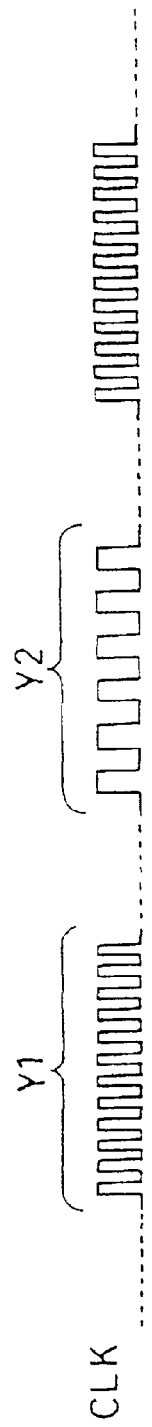

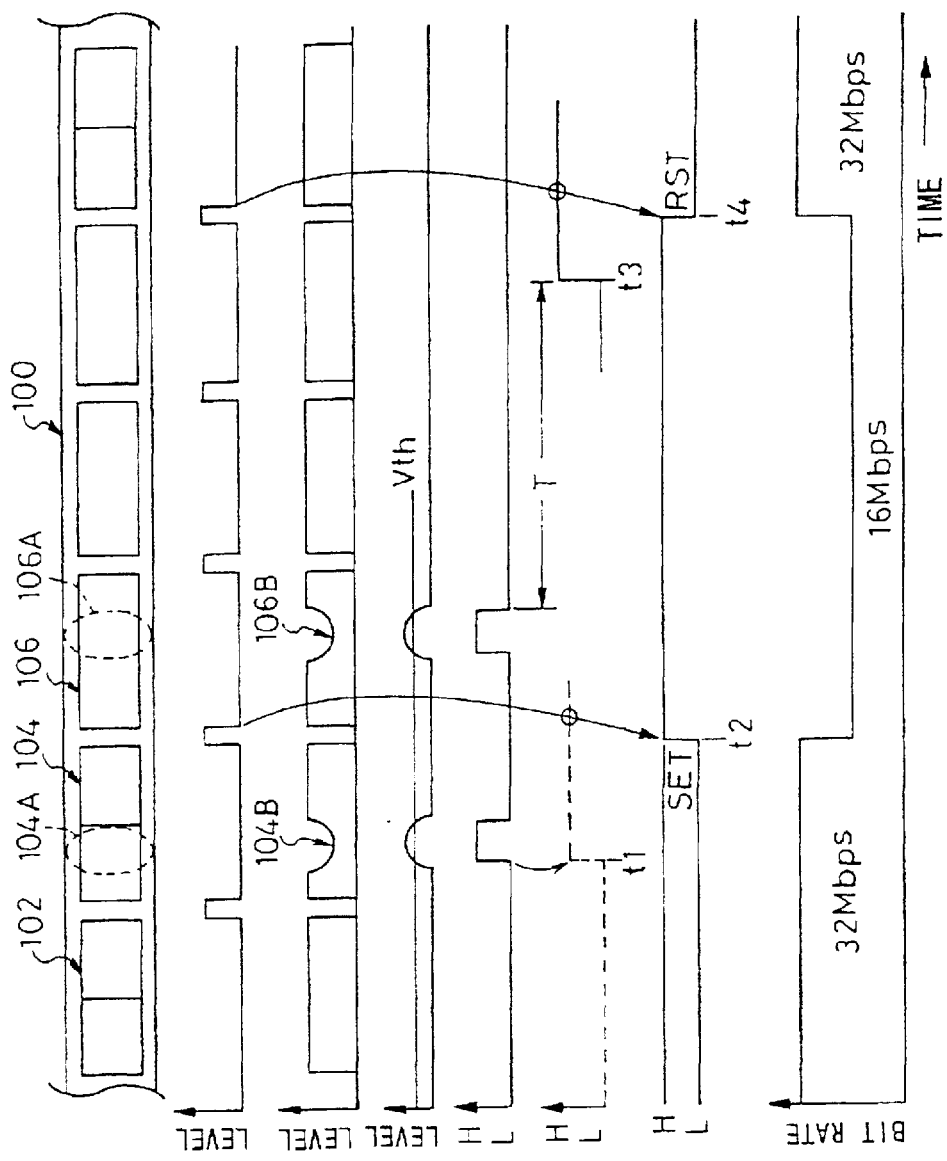

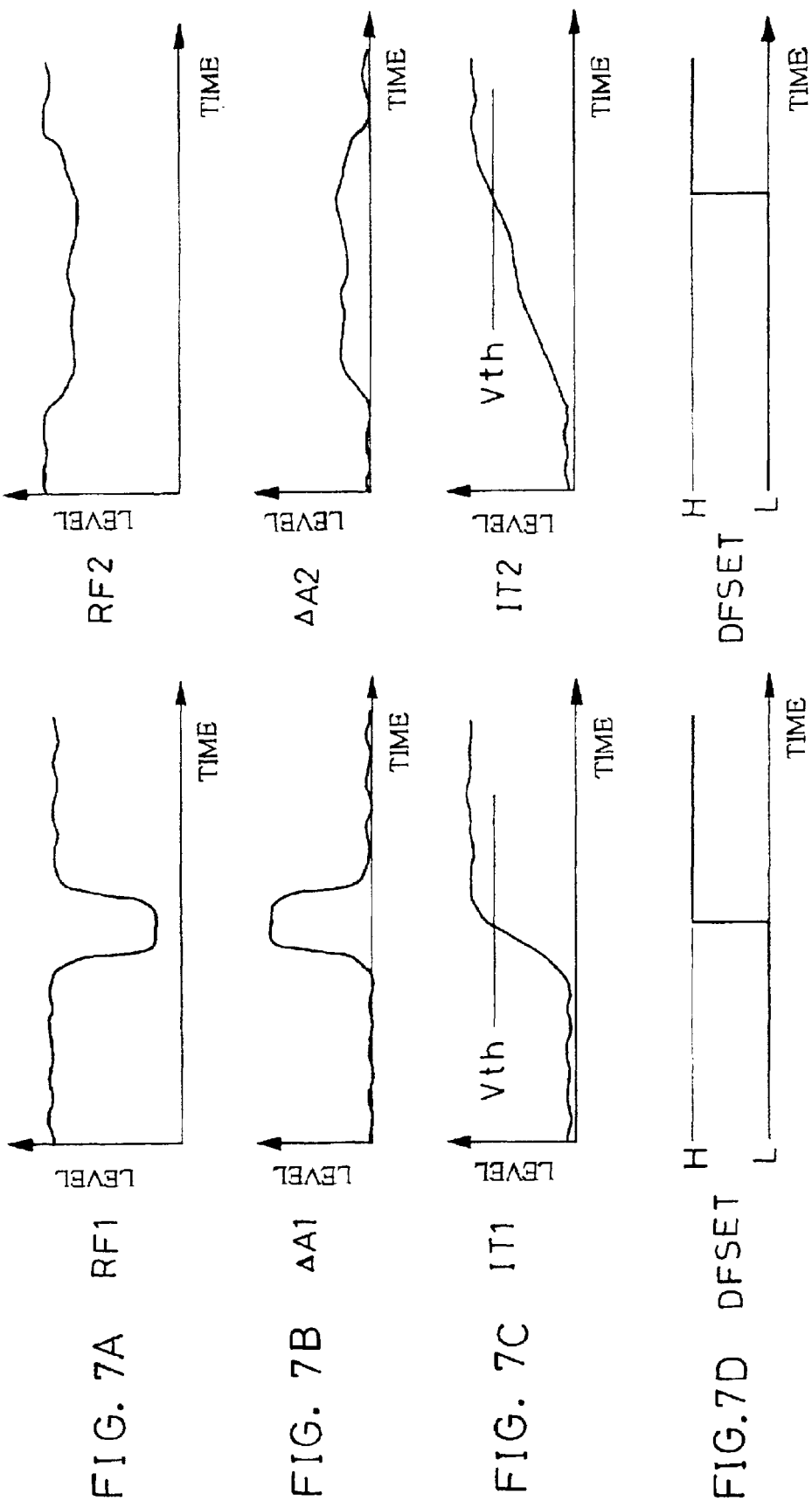

METHOD FOR INFORMATION RECORDING AND APPARATUS THEREFOR

BACKGROUND OF THE INVENTION

The present invention relates to an information recording method for recording digital video signals or digital audio signals on optical disks and to an information recording apparatus therefor.

Optical disks are excellent in the reliability of information recording and in the preservation of recorded information, and are becoming popular as large-capacity exchangeable recording media. In recent years, because of a further increase of the recording capacity of the optical disk, the optical disk is developed to record video information, such as digital video information, and audio information, such as digital audio information, in addition to character information, such as document data and information processing programs. The capacity of an optical disk can be made larger by the increase of recording density. To increase the recording density, it is necessary to make marks (pits for example) smaller, which are means for recording information on the optical disk. When the marks are made smaller, light is liable to be scattered by small flaws on the face of the optical disk or by particles of dust, fingerprints or the like attached to the surface of the disk. As a result, information can not be recorded properly on the disk. A part of the optical disk, wherein information cannot be recorded properly owing to the flaws, dust and the like, are referred to as "defect". It is difficult to reduce flaws on the face of the disk and dust attached to the surface of the disk. Therefore, together with the increase of the recording density, an occurrence frequency of the defects becomes higher. In recent years, various information recording methods have been proposed in order to avoid the occurrence of recording errors owing to the defects.

Information recording methods in the prior arts will be described below.

In accordance with an invention disclosed in Japanese Laid-open Patent Application Sho 63-58670, a first prior art, the recording area of an optical disk is divided into plural sectors. No information is recorded on a defective sector which is liable to cause errors owing to the defect. Information to be recorded on the defective sector is recorded on an alternate sector having been allocated previously. This recording method is referred to as an "alternate sector method." Defective sectors are detected by scanning at high speed all of the recording areas of an optical disk in advance, and the addresses of detected defective sectors are written in a predetermined area.

In accordance with another invention disclosed in Japanese Laid-open Patent Application Hei 5-210845, a second prior art, defects of an optical disk are classified into primary defects originally present on the optical disk and secondary defects caused later owing to dust and the like attached to the disk. Respective numbers of the primary and secondary defects are then stored in respective defect lists. When the number of the secondary defects exceeds a predetermined number, disk cleaning is carried out to repair the secondary defects.

In accordance with still another invention disclosed in Japanese Laid-open Patent Application Hei 6-111479, a third prior art, when a defective sector is found, information to be recorded on the defective sector is recorded on a first normal sector adjacent to the defective sector. Information to be recorded on the first normal sector is recorded on a second normal sector adjacent to the first normal sector. In this way, information is recorded on adjacent normal sectors one after another. As a result, information is recorded only in normal sectors one after another by avoiding recording in the defective sectors. This method is referred to as a "slipping method."

Each of the prior art described above is applicable to discontinuous information having relatively small information units such as computer data, not causing problems even when the information are recorded on plural sectors spaced apart from each other on an optical disk. The above-mentioned video or audio information has a large amount of information per unit time. Furthermore, a continuous long recording time is required, and the whole amount of the information is extremely large. For example, since video information includes a large amount of continuous information, a recording unit of information is required to be larger. In a CD-ROM for example, one error correction block corresponding to the recording unit has 2 KB of recording capacity. On the other hand, in a DVD (digital versatile disk) mainly used for recording video information, one error correction block has 32 KB of recording capacity. When the alternate sector method or the slipping method in the above-mentioned prior arts is applied to the DVD, and one defect is present in one error correction block of 32 KB corresponding to one sector, an area having a recording capacity of 32 KB is removed from use. Defects are caused by flaws on the face of the disk in most cases. Even when a small spot-like flaw having a diameter of about 1 mm is present on the face of the disk for example, the flaw affects about 1000 tracks. For this reason, if the above-mentioned alternate sector method is applied to units of one error correction block of 32 KB, an area having a recording capacity as many as 32 MB (32 KB×1000) becomes unusable. Furthermore, the defect appears once at every turn of the disk periodically on about 1000 tracks. In the DVD, the recording capacity of the error correction block of 32 KB is approximately equal to the recording capacity of one innermost track. In the case that the above-mentioned flaw is present near the innermost track, data processing based on the alternate sector method or the slipping method must be carried out incessantly in recording operation to inner 1000 tracks. This data processing causes very large data processing operation, and results in serious trouble in sequential recording of the video information supplied continuously. In the worst case, recording operation is liable to be interrupted.

BRIEF SUMMARY OF THE INVENTION

An object of the present invention is to provide an information recording method for stably recording digital video or digital audio information on an optical disk by removing the influence of defects as less as possible, and to provide an optical disk recording apparatus for carrying out the method.

An information recording method in accordance with the present invention is characterized in that defects present on an optical disk having concentric or spiral tracks are detected when information is recorded on the optical disk, and a recording density is changed depending on the detection frequency of the defects.

According to the recording method of the present invention, the recording density is made lower for example, in recording areas having many defects, than that in recording areas having no defect in dependence on the detection frequency of the defects. Consequently, data loss owing to the defects is reduced in the recording areas having many defects.

An information recording method in accordance with another aspect of the present invention is characterized in that defects present on an optical disk having concentric or spiral tracks are detected when picture information is recorded on the optical disk, and a recording density of the picture information and the number of pixels in the picture information per unit time are changed depending on the detection frequency of defects.

According to the recording method of the present invention, the recording density and the number of pixels per unit time are reduced for example, depending on the detection frequency of defects. Consequently, data loss owing to the defects is reduced in recording areas having many defects. In addition, recorded pictures can be balanced with input pictures, although picture quality is degraded owing to the reduction in the number of pixels.

An information recording method in accordance with still another aspect of the present invention comprises the steps of emitting light for recording information on a desired track of an optical disk, obtaining a detection signal by detecting light reflected by the track, detecting a defect on the basis of a drop in the level of the detection signal from a predetermined threshold value, and changing the recording density depending of the detection frequency of defects.

According to the recording method of the present invention, a detection device can be made simple since defects are detected on the basis of the drop in the level of the detection signal.

An optical disk recording apparatus in accordance with the present invention comprises a defect determination section for detecting defects present on an optical disk having concentric or spiral tracks when picture information is recorded on the optical disk and for generating a defect determination signal in dependence on the detection frequency of defects, a bit rate control section for changing the bit rate of recording in dependence on the defect determination signal, and a pixel control section for changing the number of pixels in the picture information per unit time in dependence on the defect determination signal.

According to the optical disk recording apparatus of the present invention, the number of pixels per unit time is changed depending on the detection frequency of defects. As a result, it is possible to reduce data losses in recording areas having many defects.

An optical disk recording apparatus in accordance with another aspect of the present invention comprises an optical head having a light source for emitting light for recording information on desired tracks of an optical disk and a light-receiving device for detecting light reflected from the optical disk and used for outputting a detection signal depending on the intensity of the reflected light, a defect detection section for detecting defects present on the optical disk in dependence on the level of the detection signal, a frequency detection section for obtaining the detection frequency of defects detected by the defect detection section, a bit rate control section for controlling the bit rate of information to be recorded on the optical disk in dependence on the frequency obtained by the frequency detection section, and a pixel control section for changing the number of pixels in picture information per unit time in dependence on the control output of the bit rate control section.

According to the optical disk recording apparatus of the present invention, the number of pixels in picture information per unit time is changed depending on the detection frequency of defects. As a result, it is possible to reduce data losses in recording areas having many defects.

BRIEF DESCRIPTION OF THE SEVERAL VIEWS OF THE DRAWING

FIG. 2A is a plan view showing a part of a track of the optical disk 1 by using a belt;

FIG. 2B is a diagram of the waveform of a clock signal CLK for an optical disk information recording method in accordance with the embodiment of the present invention;

FIG. 2C is a diagram of the waveform of a defect determination signal DFCT in accordance with this embodiment;

FIG. 4A is a plan view showing a part of a track of the optical disk by using a belt;

FIG. 4B to FIG. 4G are diagrams showing the waveforms of signals for the operation of the optical disk information recording apparatus in accordance with this embodiment;

FIG. 4H is a diagram showing the change in a bit rate;

FIG. 7A is a diagram showing the waveforms of output signals RF1 and RF2;

FIG. 7B is a diagram showing the waveforms of decrement signals ΔA1 and ΔA2;

FIG. 7C is a diagram showing the waveforms of integrated value signals IT1 and IT2;

FIG. 7D is a diagram showing the waveforms of set pulses DFSET1 and DFSET2;

DETAILED DESCRIPTION OF THE INVENTION

A method for recording information on an optical disk in accordance with a preferred embodiment of the present invention and an optical disk recording apparatus for carrying out the method will be described below referring to FIG. 1A to FIG. 8B.

Figure 1A:
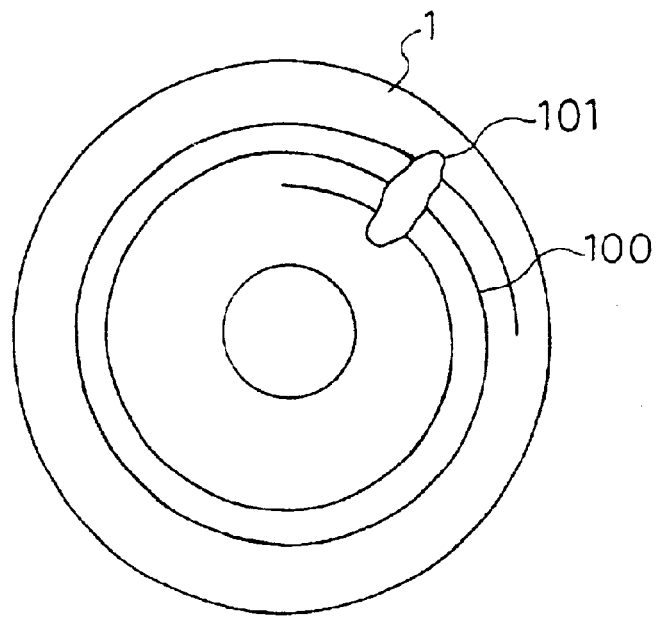
FIG. 1A is a plan view showing an optical disk 1 used for the description of an embodiment of the present invention.
Figure 1B:
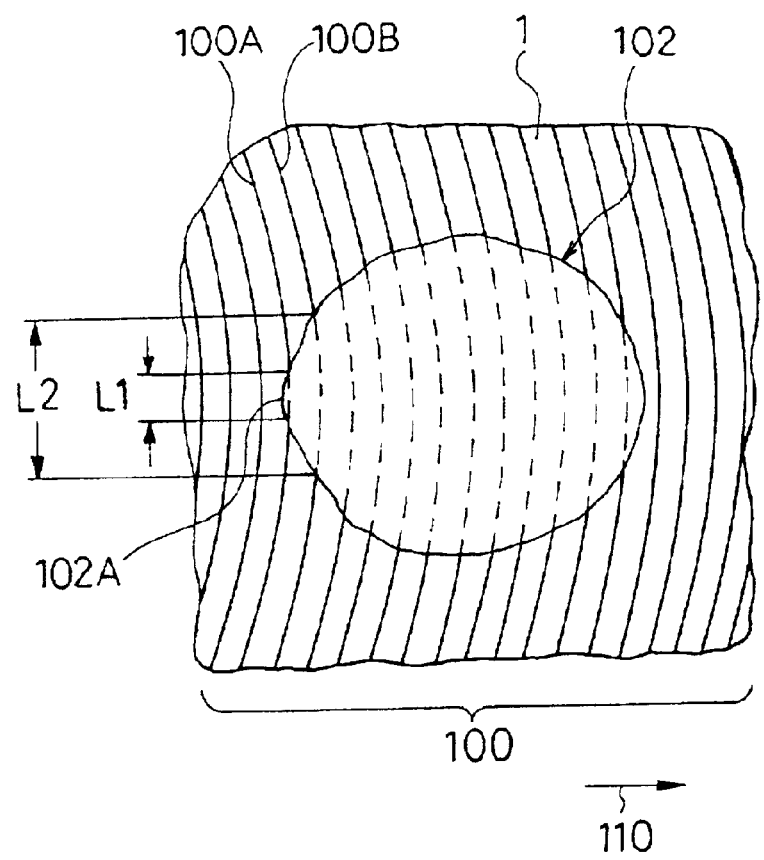
FIG. 1B is a partially magnified plan view showing the optical disk 1.

FIG. 1A is a plan view showing a conventional optical disk 1 used for the description of this embodiment. In the figure, a spiral track 100 is formed on the optical disk 1, and a defect 101 owing to flaws, particulates of dust, fingerprints or the like is present on the track 100. Concentric tracks may also be formed on the optical disk 1. The intervals between the tracks and the defect 101 are magnified for the sake of rendering the optical disk understandable. FIG. 1B is a magnified plan view showing a part of the optical disk 1, and shows a nearly circular defect 102 present on the plural tracks 100.

FIG. 2A is a plan view showing a part of the track 100 by using a linear belt. In FIG. 2A, the track 100 is divided into segments S1, S2, S3, . . . having the same length. For example, a first segment S1 has a physical ID 101 and a data area 102. The physical ID 101 has a positional information of the segment S1. For example, a concave or convex pre-pit is formed beforehand on the recording face as a concrete recording form of the physical ID 101. In another example, a track guide groove is locally displaced in the radial direction of the disk 1. Information is recorded in the data area 102 specified by the physical ID 101 in units of plural error correction blocks (ECC blocks). The ECC block is a data group including data to be recorded and an error correction code (ECC). In the example shown in FIG. 2A, two ECC blocks 1021 and 1022 are recorded in the data area 102 specified by the physical ID 101. The data size of each of the ECC blocks 1021 and 1022 is about 32 KB in the case of the DVD. If the defect 101 shown in FIG. 1A is present in the data areas 102, 104 on the surface of the optical disk 1, the laser light used to record information signals is scattered or absorbed by the defect 101. As a result, sufficient optical energy is not supplied to the recording face of the optical disk, whereby the information signals are not recorded at all or are recorded incompletely. If the incompletely recorded information signals are reproduced, errors occur. Such errors can be corrected to some extent by using error correction codes added beforehand to the information to be recorded. However, the errors can not be corrected when the defect exceeds a predetermined size.

Figure 3:
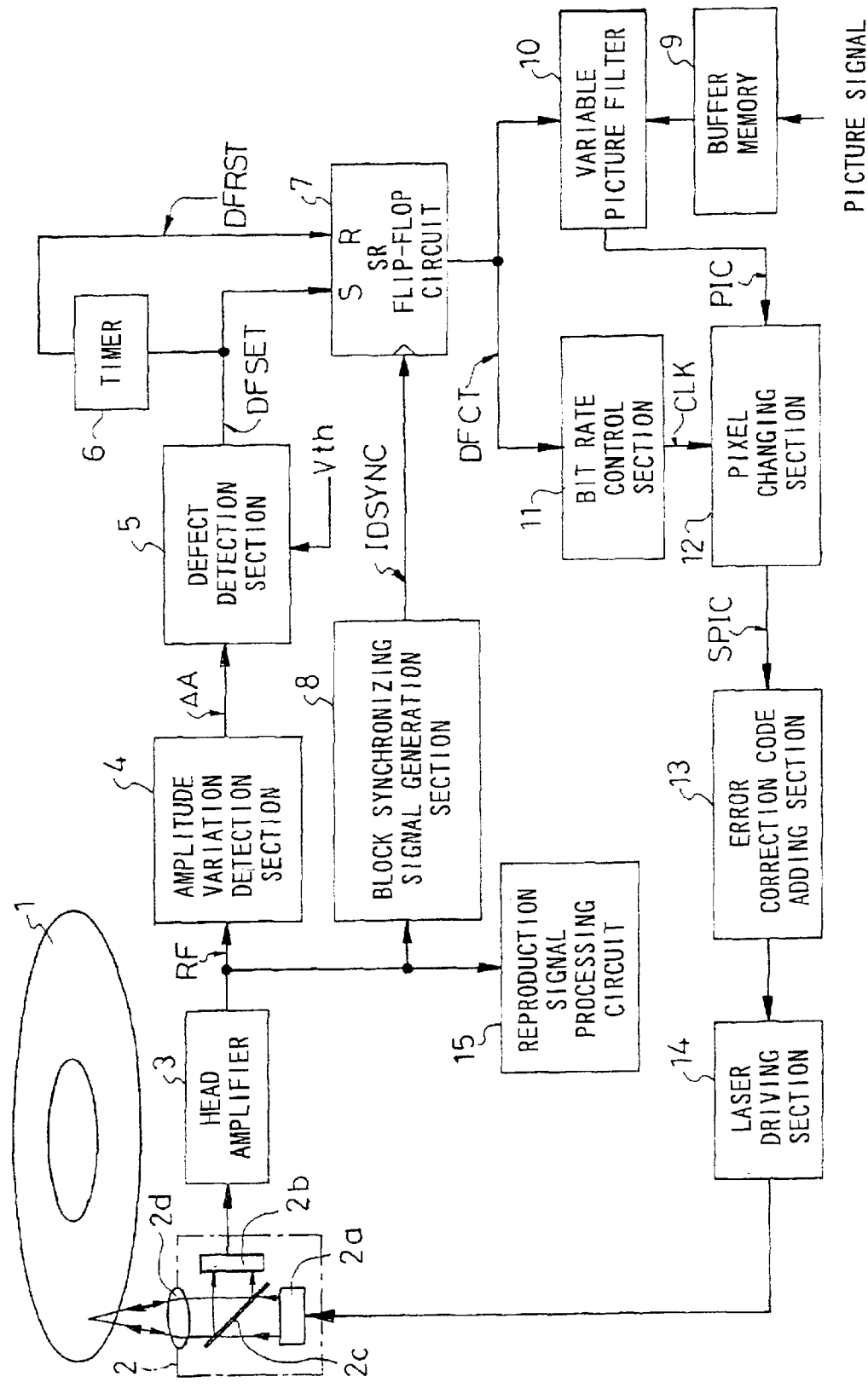
FIG. 3 is a block diagram showing an optical disk information recording apparatus in accordance with the embodiment of the present invention.

FIG. 3 is a block diagram showing an optical disk recording apparatus in accordance with the present invention.

In FIG. 3, an optical head 2 has a laser light source 2a for emitting laser light depending on a pulse current supplied from a laser driving section 14. The laser light source 2a emits laser light having a predetermined high luminous intensity for recording information on the optical disk 1, and emits laser light having a predetermined low luminous intensity for reproducing recorded information. The emitted laser light is applied to the optical disk 1 via a half mirror 2c and an optical system 2d for example. Reflected light from the optical disk 1 is reflected by the half mirror 2c, whereby its course is changed, and the light is made incident upon a light-receiving device 2b. The incident light is converted into an electrical signal by the light-receiving device 2b and input to a head amplifier 3. The head amplifier 3 amplifies the input electrical signal and outputs an output signal RF. During reproduction operation of a recorded signal, the output signal RF of the head amplifier 3 is supplied to a reproduction signal processing circuit 15 including an error correspond circuit.

During recording of a signal, the output signal RF is supplied to an amplitude variation detection section 4.

FIG. 4A to FIG. 4H are diagrams for describing the operation of the optical disk recording apparatus of the present invention. The abscissa in each diagram designates time. FIG. 4A shows a part of the track 100 of the optical disk 1 having data areas 102, 104 and 106 by using a linear belt. In FIG. 4A, the physical ID is omitted from illustration. FIG. 4B is a diagram showing the waveform of a block synchronizing signal IDSYNC. FIG. 4C is a diagram showing the waveform of the output signal RF. FIG. 4D is a diagram showing the waveform of a decrement signal ΔA indicating a decrement of the output signal RF. FIG. 4E is a diagram showing the waveform of a set pulse DFSET. FIG. 4F is a diagram showing the waveform of a reset pulse DFSRST. FIG. 4G is a diagram showing the waveform of a defect determination signal DFCT. FIG. 4H is a diagram showing a bit rate.

The operation of the optical disk recording apparatus will be described below referring to FIG. 3 and FIG. 4A to FIG. 4H. In FIG. 4A, defects 104A and 106A are present at the portions indicated by dotted ellipses in the data areas 104 and 106, respectively. The block synchronizing signal IDSYNC shown in FIG. 4B is detected based on the data areas 102, 104 and 106. When the laser light is applied on the defect, the amount of the light reflected by the optical disk 1 decreases, and the amount of the light received at the light-receiving device 2b also decreases. As a result, the amplitude of the output signal RF decreases depending on the decrease in the amount of the received light. The level of the output signal RF lowers at the defects 104A and 106A as shown in FIG. 4C, thereby causing dips 104B and 106B in the waveform. When the amplitude of the output signal RF of the head amplifier 3 becomes lower than its normal amplitude, the amplitude variation detection section 4 outputs the decrement signal ΔA which becomes higher inversely as shown in FIG. 4D.

When the level of the decrement signal ΔA exceeds a predetermined value Vth, a defect detection section 5 generates the set pulse DFSET shown in FIG. 4E (at time t1). By the set pulse DFSET, the reset pulse DFRST becomes level H as indicated in dotted lines in FIG. 4F. An SR flip-flop circuit 7 is set in synchronism with the block synchronizing signal IDSYNC at time t2, and the defect determination signal DFCT becomes level H. A timer 6 is connected across the set terminal S and the reset terminal R of the SR flip-flop circuit 7. The timer 6 turns the reset pulse DFRST level H (at time t3) when a state wherein no defect is detected after the set pulse DFSET is generated, that is, a state wherein the value of the decrement signal ΔA does not reach the predetermined value Vth continues for a predetermined time (T). The reset pulse. (DFRST) resets the SR flip-flop circuit 7 (from H to L) in synchronism with the block synchronizing signal IDSYNC at time t4. The SR flip-flop circuit 7 functions as a frequency detection section for obtaining the detection frequency of defects.

Latched by the block synchronizing signal IDSYNC shown by FIG. 4b, which is supplied from a block synchronizing signal generation section 8, the defect determination signal DFCT shown in FIG. 4G turns level L at time t4. As described later, the optical disk recording apparatus of the present invention is configured so that all the processes after defect areas have been determined are carried out in the predetermined ECC block units. To attain this, the block synchronizing signal generation section 8 generates the block synchronizing signal IDSYNC for allowing information to be recorded and reproduced in the ECC block units. For example, the block synchronizing signal IDSYNC may be a pulse signal generated at the timing of the signal based on a physical ID extracted from the output signal RF.

As shown in FIG. 4G, the defect determination signal DFCT does not determine the detection of the ECC block itself having a defect. The defect determination signal DFCT determines the number of defects detected within a predetermined period T, namely detection frequency of defects. The detection frequency of defects may be represented by a rate of ECC blocks having the defects included in a predetermined number of the ECC blocks.

In the optical disk information recording method of this embodiment, the recording density is changed in units of the ECC block in dependence on the detection frequency of defects. In FIG. 3, the defect determination signal DFCT output from the SR flip-flop circuit 7 is inputted to a variable picture filter 10 and a bit rate control section 11 for changing a recording bit rate. The variable picture filter 10 serves as a pixel control section which changes the number of pixels per unit time in dependence on the defect determination signal DFCT. The picture signal to be recorded is inputted to the variable picture filter 10 through a buffer memory 9. A picture signal PIC output from the variable picture filter 10 is inputted to a pixel changing section 12. In the pixel changing section 12, the picture signal PIC is sampled by a clock signal CLK output from the bit rate control section 11, and the number of pixels of one frame is changed. A sampled signal SPIC changed in the number of pixels is inputted to an error correction code adding section 13, an error correction code is added and the output of the error correction code adding section 13 is applied to the laser driving section 14. These elements will be described below in detail.

Referring to FIG. 2A, when recording operation is carried out in the normal data area 102 having no defect, data of the ECC blocks 1021 and 1022, each having 32 KB, are recorded in synchronism with a clock signal having a standard frequency shown in a period Y1 of FIG. 2B. During the period Y1, the defect determination signal DFCT is at level L. The bit rate control section 11 receives the defect determination signal DFCT of level L, and outputs a clock signal CLK shown in a period Y1 of FIG. 2B. As shown in FIG. 4H, the bit rate is 32 Mbps. When the defect determination signal DFCT turns level H, the bit rate control section 11 lowers the frequency of the clock signal CLK as shown in the period Y2 in FIG. 2B so as to reduce the bit rate to 16 Mbps.

As shown in FIG. 4H, the bit rate in the period from time t2 to time t4 is reduced from 32 Mbps to 16 Mbps, i.e., to half. As a result, the picture signal is recorded on the optical disk at a half bit rate. The data of one ECC block 1041 of 32 KB is recorded in the data area 104 as shown in FIG. 2A. Hence, the recording density in the data area 104 is reduced to half in comparison with the recording density in the data area 102 wherein data is recorded during normal operation. The amount of data not recorded but lost owing to the defect having the predetermined area increases when the recording density is high, and decreases when the recording density is low. The amount of data existing in a defect of a predetermined area is reduced as the result of the reduction in the recording density. Furthermore, the SN ratio of the output signal RF is improved as another effect obtained as the result of the reduction in the recording density, whereby random errors occurring in areas other than those including defects also decreases. This effect significantly reduces errors during reproduction operation. For this reason, even an error that cannot be corrected by an error correction process without the reduction of the recording density can be corrected completely by lowering the recording density.

In this embodiment, lowering the recording density by reducing the bit rate is not necessarily carried out for all ECC blocks wherein defects are detected. The above-mentioned process is carried out for only areas of the optical disk determined as having a high detection frequency of defect. In FIG. 3, the detection frequency of defect is determined by the SR flip-flop circuit 7.

For example, in FIG. 4A, the defect 104A is detected for the first time in the data area 104. However, the defect determination signal DFCT shown in FIG. 4G turns level H in the next data area 106. Therefore, recording is carried out at the recording density for the normal operation (hereafter referred to as a normal recording density) in the data area 104, although a defect is present in the data area 104. Although errors increase in the data area 104, the effect of errors becomes less significant in the whole of the optical disk 1 as described below. This will be described referring to FIG. 1B in detail.

The defect 102 shown in FIG. 1B is caused by a particulate contamination of a nearly circular shape. Description is made as to the case that a recording position moves from an internal track to an external track of the disk 1 as indicated by an arrow 110 so as to record sequentially data on the disk 1. When the recording position moves in the direction of the arrow 110, the length of the defect 102 is L1 on a track 100A passing through the end portion 102A of the defect 102 in the inner part of the disk 1. The length of the defect 102 is L2 on a track 100B located outward from the track 100A, and the length L2 is longer than the length L1. Since the length of the track 100A affected by the defect 102, equal to the length L1 of the defect, is shorter at the end portion 102A of the defect 102 as described above, data losses owing to the defect 102 occur less frequently. For this reason, even when recording is carried out at the normal recording density in the data areas having the length L1 on the track 100A, the number of data losses is not large. When recording is carried out on the tracks located outward from the track 100B, the recording density is lowered, whereby the amount of data losses decreases.

If the recording density is reduced in the portion of the length L1 on the track 100A passing the end portion 102A of the defect 102, a problem will occur as described below. At the time when a defect is detected in the end portion 102A of the defect 100, information has already been recorded in some data areas in the portion of the length L1 at the normal record density. Therefore, in order to record in the portion of the length L1 at a lower recording density, it is necessary to carry out recording in the same areas at the lower recording density by tracing the track 100A once again. This kind of operation causes a delay in recording. This delay causes the congestion in data processing, and recording might be interrupted in the worst case.

When the recording density is lowered in portions having defects on the optical disk 1, the total storage capacity of the optical disk 1 decreases. The recording time of an optical disk capable of recording motion pictures is reduced from two hours to one hour and 50 minutes at the normal recording density, for example. In order to solve this problem, the optical disk recording apparatus shown in FIG. 3 conducts a pixel control by a pixel control section comprising the buffer memory 9, the variable picture filter 10 and the pixel changing section 12.

In FIG. 3, a picture signal to be recorded on the optical disk 1 is stored once in the picture buffer memory 9. The picture signal stored in the picture buffer memory 9 is read in synchronism with a predetermined clock signal and supplied to the variable picture filter 10. The cut-off frequency of the variable picture filter 10 is changed depending on the defect determination signal DFCT.

Figure 5A:
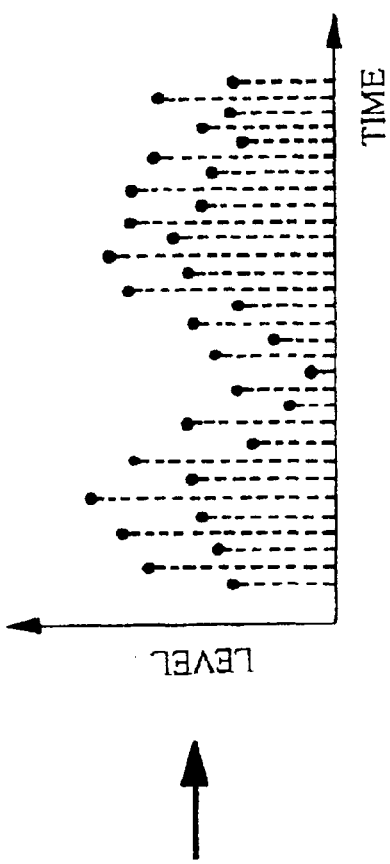
FIG. 5A is a diagram showing the waveform of a standard picture signal at the time when recording is carried out at a normal recording density.

FIG. 5A is a diagram showing the waveform of the picture signal output from the variable picture filter 10 at the time when the defect determination signal DFCT is level L. This signal is referred to as a standard picture signal PIC. FIG. 5B shows a sampled signal SPIC obtained by sampling the standard picture signal by the pixel changing section 12.

Figure 5C:
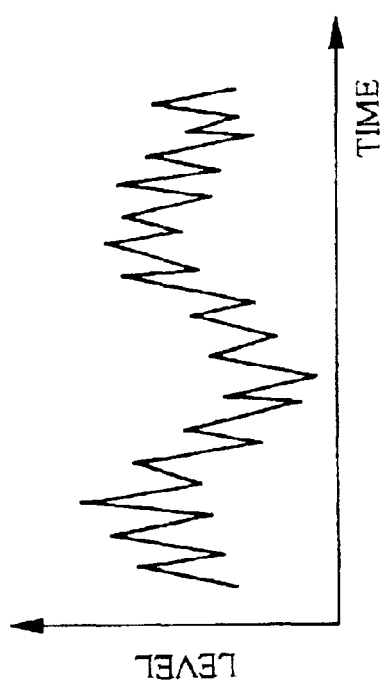
FIG. 5C is a diagram showing the waveform of a narrow band picture signal at the time when recording is carried out at a lower recording density.
Figure 5B:
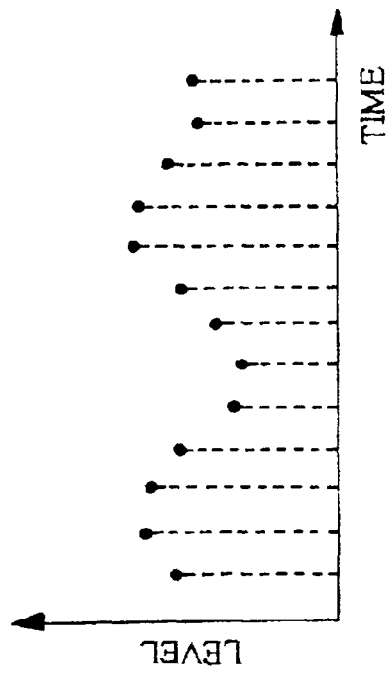
FIG. 5B is a diagram showing a sample signal obtained from the standard picture signal.
Figure 5D:
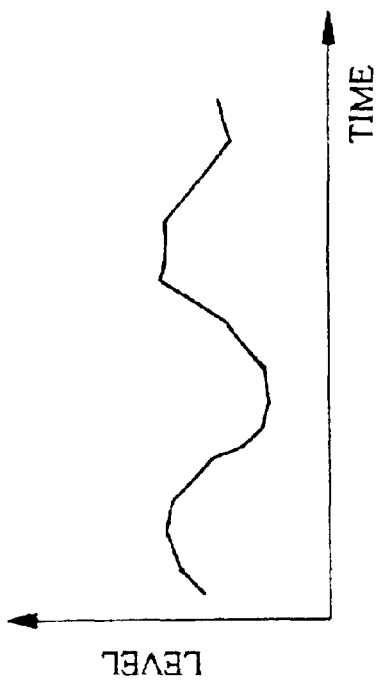
FIG. 5D is a diagram showing a sample signal obtained from the narrow band picture signal.

FIG. 5C is a diagram showing the waveform of the picture signal output from the variable picture filter 10 at the time when the defect determination signal DFCT is level H. This signal is referred to as a narrow band picture signal. FIG. 5D shows a sampled signal SPIC obtained by sampling the narrow band picture signal by the pixel changing section 12.

When the defect determination signal DFCT is level H, the high-frequency components of the picture signal are eliminated, and the signal becomes the narrow band picture signal PIC. The narrow band picture signal is sampled by the picture changing section 12 on the basis of the clock signal CLK of the frequency lowered by the defect determination signal DFCT of level H. As a result, the number of pixels is reduced by the amount corresponding to the lowering in the frequency of the clock signal. For example, during recording operation at the normal recording density, at which the defect determination signal DFCT is level L, 720×1280 pixels are sampled per frame. In a region wherein the defect determination signal DFCT is level H, 510×720 pixels are sampled at a half of the clock rate for the normal recording density.

By lowering the clock rate as described above, the number of pixels per frame is reduced, and the amount of picture information is also reduced. As a result, the data processing time per frame during recording does not change although the recording density is lowered. For this reason, pictures can be recorded while changing the recording density as desired, without affecting the transfer rate of the picture signal supplied to the buffer memory 9.

As the result of the lowering of the clock rate, since the number of pixels per frame is reduced, picture quality is lowered. In the above-mentioned case, when the number of the pixels is 720×1280, the same picture quality as that of a high-definition TV (HDTV) is obtained. On the other hand, when the number of the pixels is 510×720, the picture quality is as low as that of an NTSC standard TV. In other words, the picture quality of the high-definition TV (HDTV) can be obtained when the recording density is normal. However, if the optical disk 1 has a defect, the picture quality becomes as low as that of the NTSC standard TV. However, since the recording density is halved in the data area having the defect, the occurrence frequency of errors is reduced significantly. If recording is carried out at the normal recording density in the data area having the defect, pictures are lost partially owing to errors during recording. In accordance with this embodiment, although the picture quality is lowered, the picture is prevented from partial disappearance of image. It is possible to prevent a picture screen from deterioration owing to the partial disappearance of image.

In this embodiment, as shown in FIG. 2A, description has been made as to the case wherein the data area 102 having the plural ECC blocks 1021 and 1022 is recorded together with the physical ID 101. However, the present invention is not limited to this case. In the case that a physical ID is placed on a track displaced in the radial direction of the optical disk for example, even if the physical ID is overwritten by information to be recorded, the data area can be identified sufficiently. In this case, the ECC blocks may be continuously recorded on the track. Furthermore, the physical ID is not limited to the type having the so-called concentrated address form shown in FIG. 2A. The physical ID may have such a distributed address as used for an MD (minidisk), for example.

In the embodiment described above, determination whether a defect is present or absent is made on the basis of only the change in the amplitude of the output signal RF as shown in FIG. 4C and FIG. 4D. Defects of the optical disk 1 include a deep and small defect due to flaw and a shallow and large defect due to fingerprint. In the former case, information to be recorded on the defect is lost completely, and all the reproduced data on the defect result in errors. In the latter case, the amplitude of the output signal RF lowers, whereby the reproduced data on the defect portions cause random errors. If random errors continue for a long time, error correction might become inoperative sometimes in the normal recording density.

In this embodiment, the recording density and the number of pixels are reduced in the recording areas in which the detection frequency of defect is in the range exceeding error correction ability. However, if only the change in the amplitude of the output signal RF is used to determine whether a defect is present or absent, the above-mentioned shallow and large defects might be overlooked.

Figure 6:
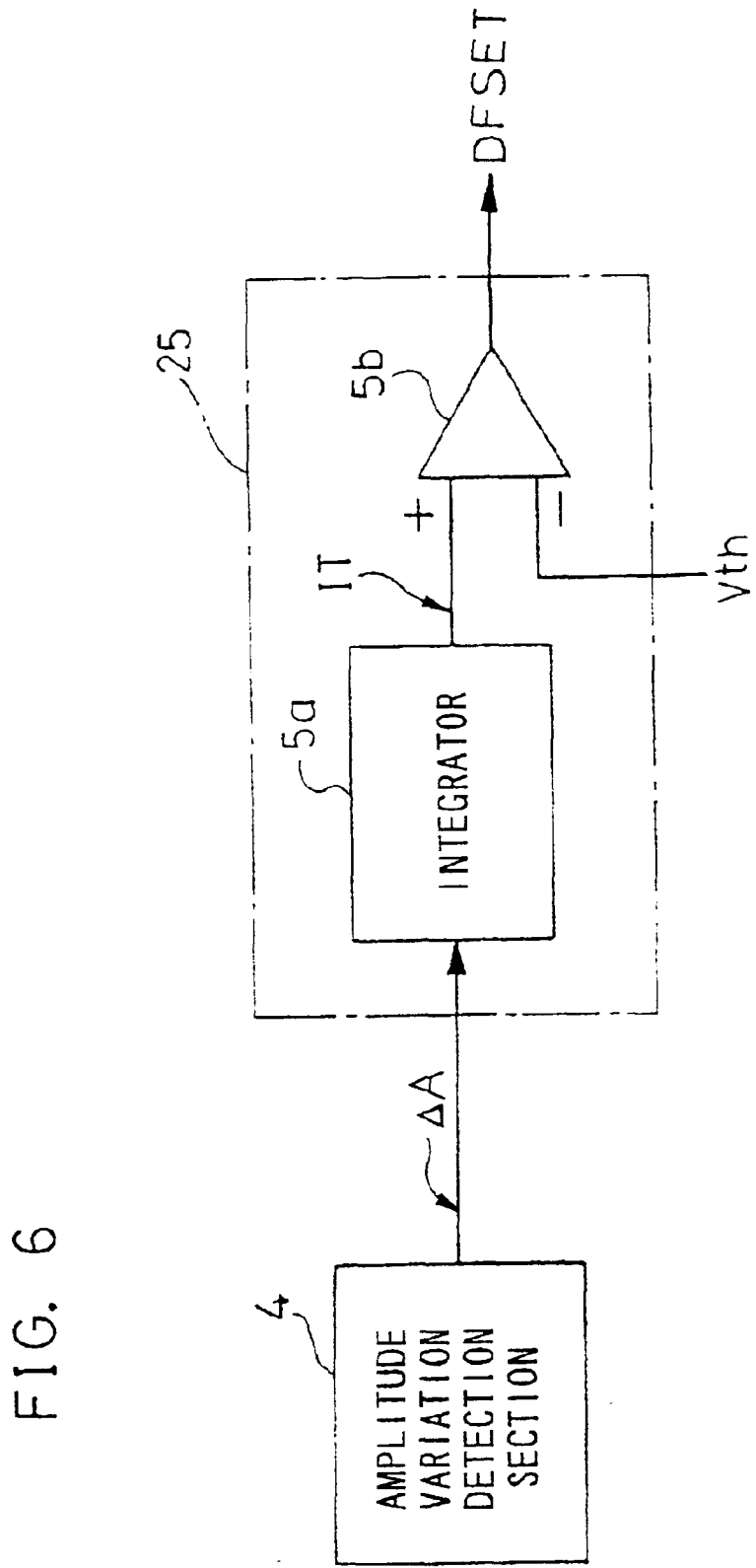
FIG. 6 is a block diagram showing a defect detection section.

A defect detection section 25 shown in FIG. 6 is another example of the defect detection section 5, and includes an integrator 5a and a comparator 5b. The decrement signal $\Delta A$ output from the amplitude variation detection section 4 is input to the integrator 5a and integrated. An integrated value per a predetermined time is input to the comparator 5b, and compared with the predetermined level Vth. The comparison output of the comparator 5b is output as a set pulse DFSET. The integrator 5a requires a resetting means so as to be reset to its initial state as necessary.

In FIG. 7A, a left-hand waveform diagram shows an output signal RF1 in the case that a deep flaw is present in the optical disk 1, and a right-hand waveform diagram shows an output signal RF2 in the case that a fingerprint is present. Left-hand and right-hand waveform diagrams in FIG. 7B show the decrement signals $\Delta A1$ and $\Delta A2$ of the output signals RF1 and RF2, respectively. Left-hand and right-hand waveform diagrams in FIG. 7C show the integrated values IT1 and IT2 of the decrement signals $\Delta A1$ and $\Delta A2$, respectively. Left-hand and right-hand waveform diagrams in FIG. 7D show set pulses DFSET1 and DFSET2 depending on the integrated values IT1 and IT2, respectively.

In FIG. 6 and FIGS. 7A to 7D, the decrement signals $\Delta A1$ or $\Delta A2$ is integrated for a predetermined period by the integrator 5a. The output of the integrator 5a is compared with the predetermined level Vth by using the comparator 5b. As a result, the integrated values IT1 or IT2 is used to determine whether a defect is present or absent. Consequently, a defect can be securely detected even in the case that the decrement signal $\Delta A2$ has a low level and a long duration caused by the defect due to such as the fingerprint.

Description is made as to reproduction of information recorded at recording densities changed by the recording method of this embodiment. In reproducing operation, the data of the recording density of ECC blocks, i.e., a clock rate is required to be given to a reproduction device by methods described below. As a first method for giving the clock rate, the addresses of the ECC blocks of which the recording density are changed are stored in the administrative area of the optical disk 1 in recording operation. In reproducing operation, the information recorded in the administrative area is read out, and the clock rate in the reproducing operation is controlled on the basis of the data in the administrative area.

As a second method, clock rate information corresponding to the normal recording density is recorded on the optical disk beforehand by wobbling grooves. In reproducing operation, the clock rate of the clock rate information is compared with the clock rate of the recorded information, and the clock rate in the normal recording density and the clock rate in the changed recording density are detected. Hereafter, the record method is described in detail with reference to FIG. 8A and FIG. 8B.

Figures 8A, 8B:
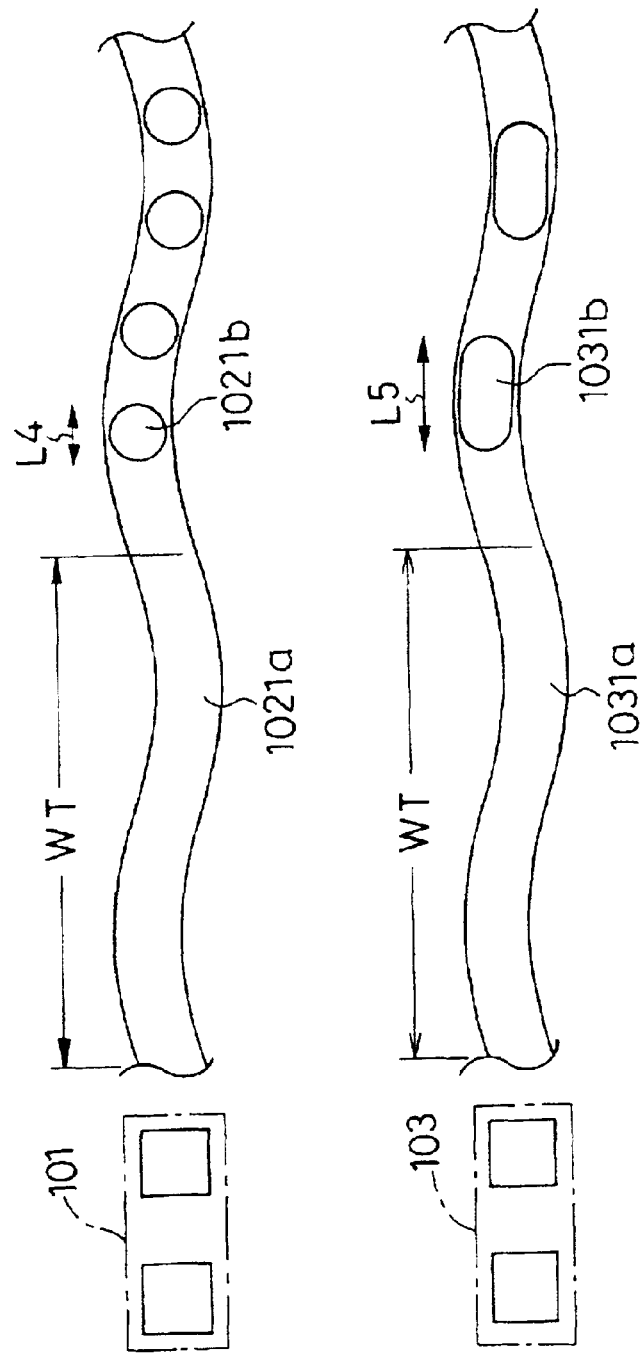
FIG. 8A shows the recording marks of a wobbling groove 1021a at the time when recording is carried out at the normal recording density.
FIG. 8B shows the recording marks of a wobbling groove 1031a at the time when recording is carried out at a low recording density.

FIG. 8A shows recording marks 1021b of a wobbling groove 1021a at the normal recording density, and FIG. 8B shows the recording marks 1031b of a wobbling groove 1031a at a low recording density. Numerals 101 and 103 designate physical IDs of the wobbling grooves 1021a and 1031a, respectively.

As shown in FIG. 8A, the wobbling groove 1021a wobbling at a predetermined period WT is formed beforehand on the optical disk 1. The wobbling period WT corresponds to the clock period in the normal recording density. In addition, a VFO mark 1021b having a period four times the period of the clock for example is recorded at the head of each ECC block so as to correspond to the clock rate of recorded information. The VFO mark serves as a synchronizing signal. In information blocks changed in the recording density, as shown in FIG. 8B, a clock period calculated from the wobbling period WT of the grooves 1021a and 1031a are defined as a standard period WT. When the length of a VFO mark obtained based on the standard period WT is L4 such as a VFO mark 1021b, it is determined that the recording operation is carried out at the normal recording density. On the other hand, when the length of a VFO mark obtained based on the standard period WT is L5 such as a VFO mark 1031b, twice the length L4, it is determined that the recording operation is carried out at the reduced recording density. Consequently, a clock rate can be immediately determined by the above-mentioned operation. Once the clock rate is determined, the clock rate for reproduction can be changed immediately by doubling the frequency division ratio of a data PLL included in the bit rate control section 11.

In this embodiment, the information amount per frame is reduced by reducing the number of pixels. As another method, the number of frames per second may be reduced from 30 to 15 for example in order to reduce information. Furthermore, the reduction of the number of pixels may be combined with the reduction of the number of frames.

In this embodiment, the defects are detected on the basis of the amplitude of the output signal RF. As another method for detecting the defects, the following method may also be used, for example. The wobble of a groove is detected with a light-receiving device having plural light-receiving regions, and the standard period WT is detected on the basis of the difference between the signals output from the plural light-receiving regions, that is, the so-called push-pull signal. If the amount of light is lowered by a defect, the level of the detection signal is also lowered. It is thus possible to detect the defect on the basis of this change.

In the present invention, information is recorded by changing the recording density in dependence on the frequency at which defects are detected, or by changing the number of pixels per unit time. As a result, digital video or audio information can be recorded stably on an optical digital medium while the effect of defects is prevented as much as possible from surfacing.

What is claimed is:

1. An information recording method comprising the steps of:

detecting a defect present on an optical disk having concentric or spiral tracks when information is recorded on said optical disk, and changing recording density in response to the value of the detection frequency of said defects.

2. An information recording method comprising the steps of:

detecting a defect present on an optical disk having concentric or spiral tracks when picture information is recorded on said optical disk, and changing the recording density of the picture information and the number of pixels in the picture information per unit time in response to the value of the detection frequency of defects.

3. An information recording method in accordance with claim 1 further comprising the steps of:

lowering recording density when a first predetermined number of defects are detected, and raising recording density when the number of defects detected in subsequent predetermined period is less than a second predetermined number.

4. An information recording method in accordance with claim 1, wherein a determination is made whether said defect is present or absent in response to a drop from a predetermined threshold value in the amplitude of a signal obtained on the basis of the reflected light of a light irradiating said optical disk to record information.

5. An information recording method comprising the steps of:

irradiating light for recording information on a desired track of an optical disk, obtaining a detection signal by detecting light reflected by said track, detecting a defect on the basis of a drop in the level of said detection signal from a predetermined threshold value, and changing recording density in response to said detection frequency of defects.

6. An information recording method in accordance with claim 5, wherein said detection frequency of defects is represented by the number of defects detected continuously.

7. An information recording method in accordance with claim 5, wherein said detection frequency is represented by the number of defects detected per unit time.

8. An information recording method in accordance with claim 5, wherein said detection frequency is represented by a rate of error correction blocks having said defect in a predetermined number of error correction blocks of said optical disk.

9. An information recording method in accordance with claim 5, wherein said recording density is changed in error correction block units.

10. An information recording method in accordance with claim 9, wherein an integer number of error correction blocks are recorded in an area specified by a physical ID disposed at predetermined intervals on said optical disk.

11. An optical disk recording apparatus comprising:

a defect detection section for detecting a defect present on an optical disk having concentric or spiral tracks when picture information is recorded on said optical disk and for generating a defect determination signal in response to the value of the detection frequency of said defects, a bit rate control section for changing a bit rate of recording in response to said defect determination signal, and a pixel control section for changing the number of pixels in said picture information per unit time in response to said defect determination signal.

12. An optical disk recording apparatus in accordance with claim 11, wherein said defect detection section generates said defect determination signal when the amplitude of a signal obtained on the basis of the reflection light of light irradiated to said optical disk to record information is a predetermined value and below, and said defect detection section does not generate said defect determination signal when the state of the amplitude of said signal being larger than said predetermined value continues for a predetermined period.

13. An optical disk recording apparatus in accordance with claim 11, wherein said pixel control section has a variable picture filter changeable a cut-off frequency, and said cut-off frequency is changed depending on said defect determination signal.

14. An optical disk recording apparatus comprising:

an optical head having a light source for emitting light for recording information on desired tracks of an optical disk and a light-receiving device for detecting light reflected from said optical disk and outputting a detection signal depending on the intensity of the reflected light, a defect detection section for detecting defects present on said optical disk in response to the level of said detection signal, a frequency detection section for obtaining the detection frequency of defects detected by said defect detection section, a bit rate control section for controlling the bit rate of information to be recorded on said optical disk in response to the frequency obtained by said frequency detection section, and a pixel control section for changing the number of pixels in picture information per unit time in response to the control output of said bit rate control section.

15. An optical disk recording apparatus in accordance with claim 14, wherein said frequency detection section is an SR flip-flop circuit.

16. An information recording method comprising the steps of:

detecting a defect present on an optical disk having concentric or spiral tracks on which a picture signal is recorded, and lowering recording bit rate of the picture signal when the defect is detected in a proper time period.

17. An optical disk recording apparatus comprising:

a defect detection section for detecting a defect present on an optical disk having concentric or spiral tracks on which a picture signal is recorded, a bit rate control section for lowering a bit rate of the recording picture signal when the defect is detected in a proper time period.

18. An optical disk recording apparatus in accordance with claim 17, wherein further comprising a pixel control section for changing the number of pixels of said picture when the defect is detected.

* * * * *